United States Patent Office.

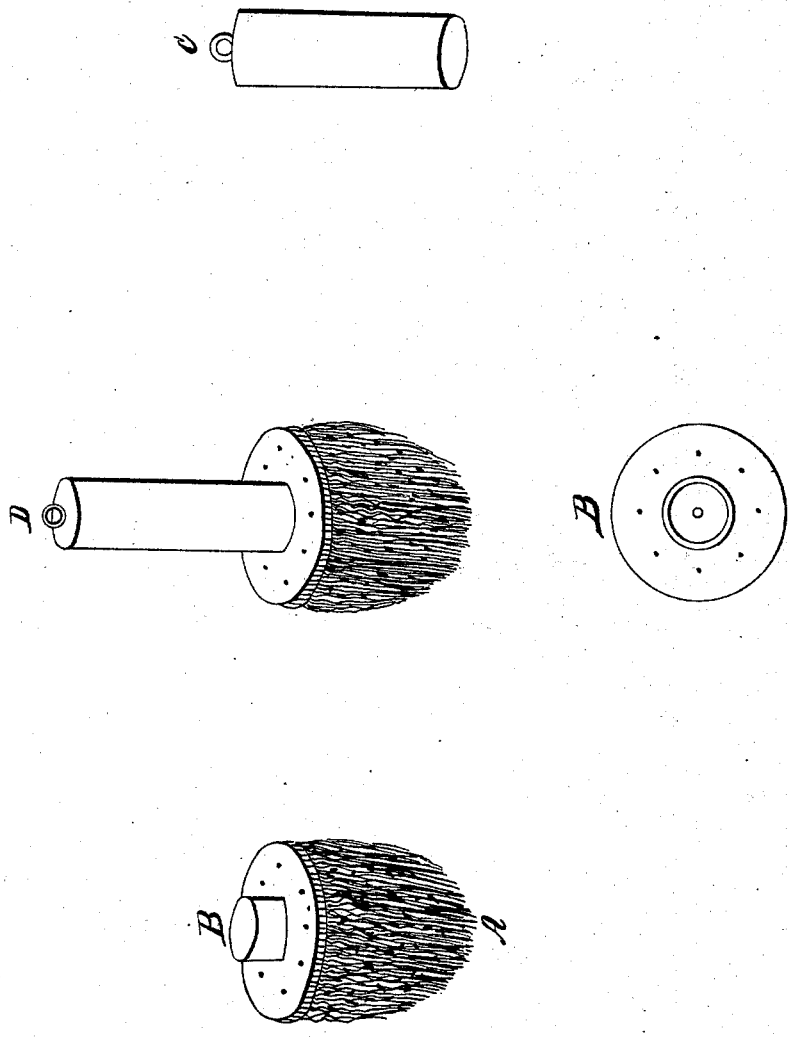

SLATE CLEANER.

ABRAHAM W. OVERBAUGH, OF NEW YORK, N. Y.

Letters Patent No. 60,045, dated November 27, 1866.

SPECIFICATION.

TO ALL WHOM IT MAY CONCERN:

Be it known that I, ABRAHAM W. OVERBAUGH, of New York, in the county of New York, and State of New York, have invented a new and improved Slate Cleaner; and I do hereby declare that the following is a full and exact description thereof, reference being had to the accompanying drawings, and to the letters of reference marked thereon.

The nature of my invention consists in a sponge, as shown by fig. A, attached to a circular plate by means of a rim of metal or other substance, as shown by fig. B; this plate has a cup on top, with an opening in the centre through which the sponge is supplied with water, contained in a tube, as shown by fig. C, closed at one end, and fitted on to the cup attached to the plate B.

Figure D is a perspective view of a slate cleaner.

Figure A is a view of sponge and plate, showing the cup on plate to which the sponge is attached.

Figure B is a front view of the plate and cup, showing the opening in the centre.

Figure C is a view of the tube from which the sponge is supplied with water.

What I claim as my invention, and desire to secure by Letters Patent, is—

The plate and tube for moistening the sponge.

ABRAHAM W. OVERBAUGH.

Witnesses:
　GILBERT S. KING,
　NELLIE A. KING.